Figure 4:
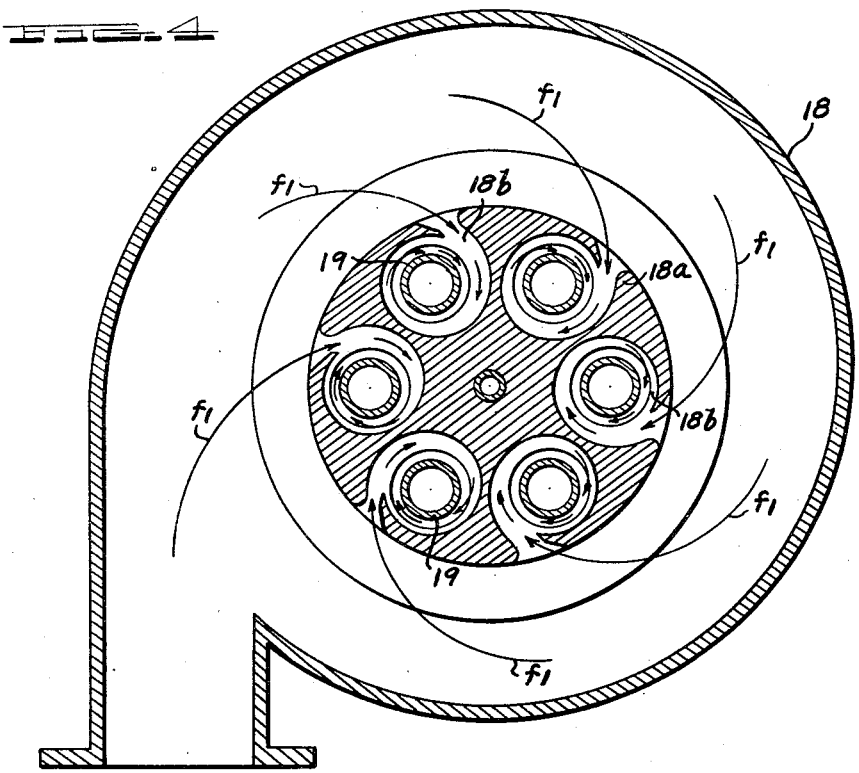

Dec. 5, 1950        A. C. BERGÈS        2,532,885
VORTEX TYPE SEPARATOR FOR PAPER PULP
Filed April 9, 1948        3 Sheets-Sheet 1
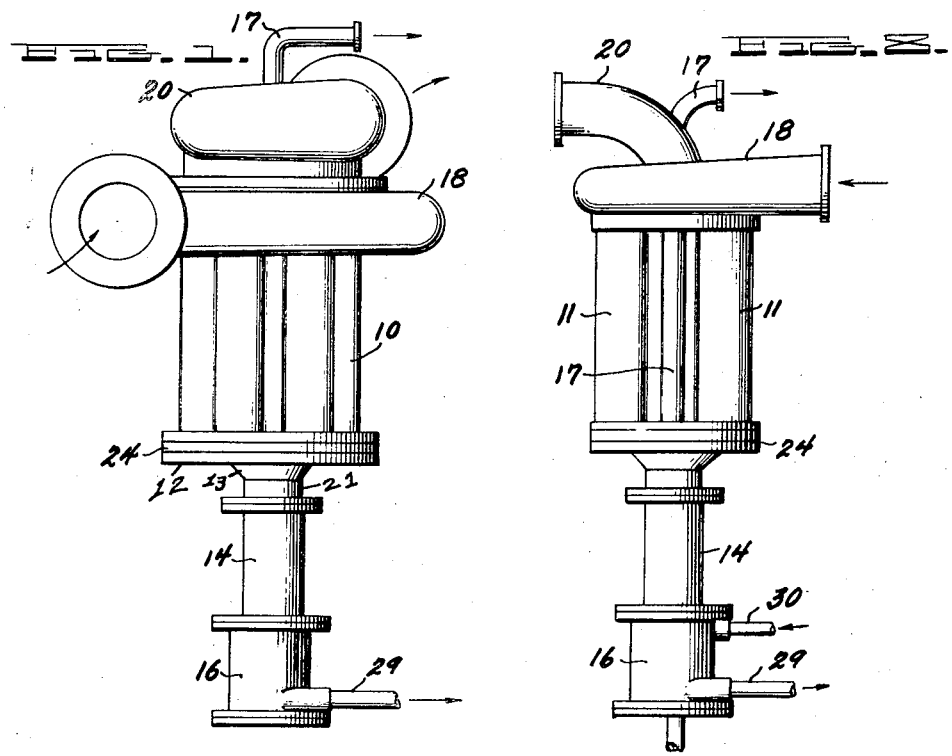
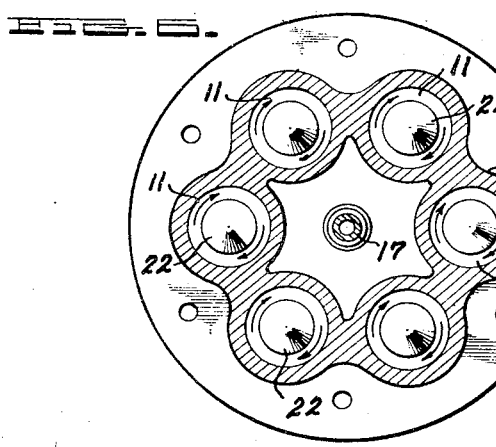
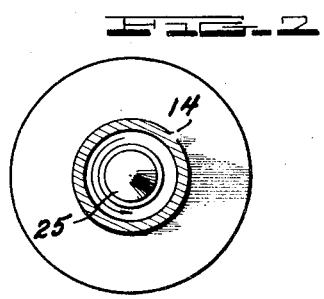
INVENTOR
*André Charles Bergès*
BY
ATTORNEY Dec. 5, 1950     A. C. BERGÈS     2,532,885
VORTEX TYPE SEPARATOR FOR PAPER PULP
Filed April 9, 1948     3 Sheets-Sheet 2
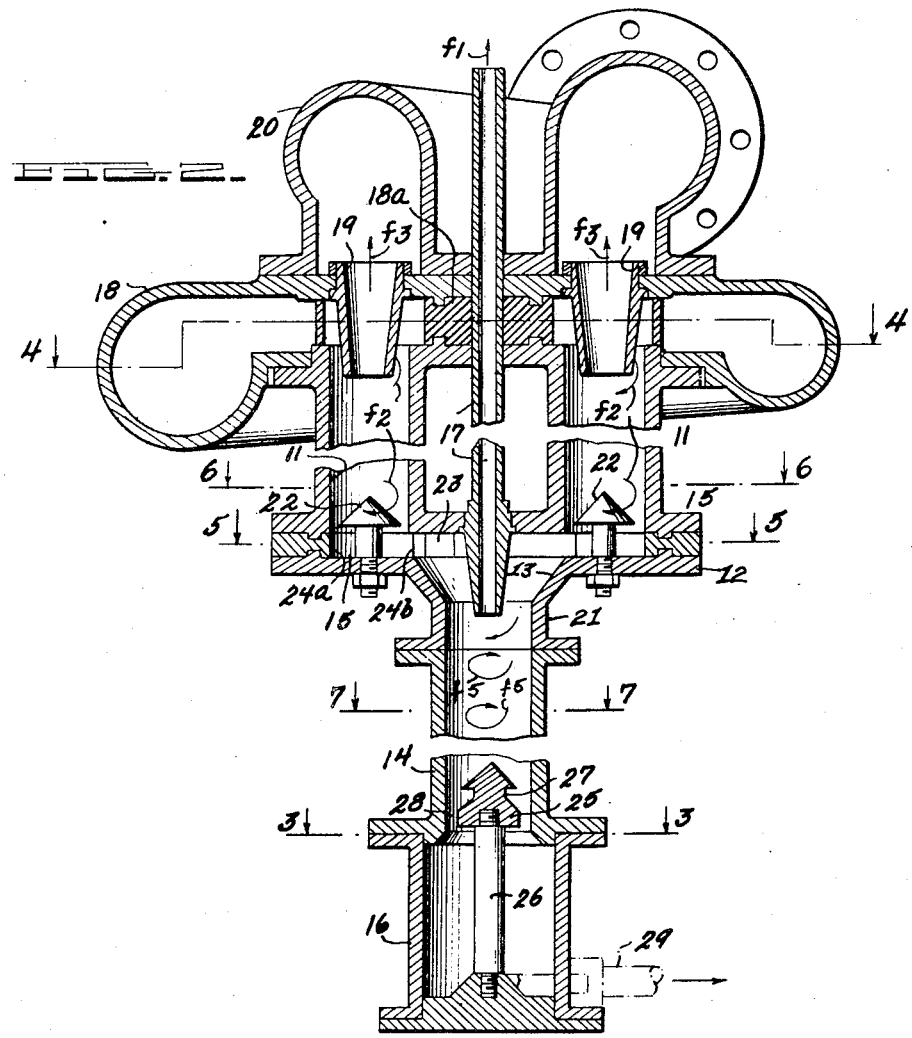
INVENTOR
ANDRÉ CHARLES BERGÈS
BY
ATTORNEY Dec. 5, 1950 A. C. BERGÈS 2,532,885
VORTEX TYPE SEPARATOR FOR PAPER PULP
Filed April 9, 1948 3 Sheets-Sheet 3

INVENTOR
André Charles Bergès
BY
ATTORNEY

Patented Dec. 5, 1950

2,532,885

UNITED STATES PATENT OFFICE 2,532,885

VORTEX TYPE SEPARATOR FOR PAPER PULP

André Charles Bergès, Mimisan-Plage, France

Application April 9, 1948, Serial No. 19,932
In France April 11, 1947

11 Claims. (Cl. 92—28)

This invention relates to vortex type separators for paper pulp. Such machines, one of which is described in my earlier United States Patent No. 2,098,608, comprise an upright cylindrical vortex vessel having at its upper end a tangential pulp inlet and a central pulp outlet for withdrawing purified stock upwardly from out of the vortex vessel. The heavy impurities, hereinafter termed "dirt," are thrown outwardly by centrifugal force towards the inner wall of the vortex vessel and collect at the bottom of the vessel, and the normal practice is to withdraw the dirt downwardly from the bottom of the vortex vessel through a bottom outlet located opposite the upper outlet for purified pulp.

This invention has for its object to provide a vortex type separator for paper pulp capable of a large output, which may be operated with a minimum of attendance and which occupies a minimum of space.

The vortex type separator for paper pulp according to the invention comprises a plurality of upright cylindrical vortex vessels, each having, at its upper end, a tangential inlet for pulp and a central outlet for withdrawing purified pulp from the vessel in an upward direction, and having a blind lower end containing a central upstanding baffle defining, with the inner wall of the vessel, an annular dirt-collecting zone, an upright cylindrical collecting chamber common to and beneath the vortex vessels, the vortex vessels being grouped closely around the collecting chamber and each having a side outlet for discharging dirt-laden liquid tangentially from its annular dirt-collecting zone directly into the upper end of the collecting chamber, said outlets discharging tangentially into the collecting chamber, and a central outlet at the upper end of the collecting chamber for withdrawing upwardly therefrom good stock which may be separated from the dirt as the result of vortex formation in the collecting chamber.

By stating that each of the vortex vessels has a blind lower end, I mean that the bottom of the vessel is imperforate, the only bottom outlet being the side outlet by which dirt is discharged directly into the upper end of the common collecting chamber. The central upstanding baffle in the lower blind end of the vortex vessel prevents dirt from being sucked upwardly from the lower end of the vortex vessel into the ascending stream of good stock which is travelling towards the top outlet and, as above noted, in cooperation with the inner wall of the vortex vessel defines an annular zone for collecting the dirt. Swirling action continues in this annular zone, from which the dirt is continuously discharged in a tangential direction through the side outlet.

Two, three or more vortex vessels may be associated with the common collecting chamber. By stating that the vortex vessels are above and grouped closely around the collecting chamber I mean that they are grouped closely about the upward prolongation of the axis of the collecting chamber and, by saying that the side outlets from the vortex vessels communicate directly with the upper end of the collecting chamber, I exclude the interposition of pipes between the vortex vessels and the collecting chamber, since these would reduce the velocity of the dirt-laden liquid flowing from the vortex vessels and so prevent any effective vortex formation in the collecting chamber.

The arrangement according to the invention is suitable for high speed large machines such as are required, for example, for making newsprint and kraft paper. As the apparatus includes a plurality of vortex vessels it has a large output but, due to the close grouping of these vessels around the common collecting chamber for receiving the dirt, the apparatus takes up a minimum of space. The cost of manufacture is considerably less than that of a number of separate separators of corresponding capacity, each with its own vortex vessel and collecting chamber, since a single inlet feed head can be used for feeding pulp to all the vortex vessels, and also a single outlet head for receiving purified pulp from all the vortex vessels. Moreover, a single chamber collects the dirt from all the vortex vessels. This, as above noted provides for a further separation of good stock from the dirt due to vortex formation therein as the result of the dirt-laden liquid being discharged directly and tangentially into the chamber from tangential side outlets in the vortex vessels. Moreover, since the dirt is discharged from the vortex vessels through side outlets at their lower ends, and not through holes in the bottoms of the vortex vessels, any tendency of dirt to be sucked back from the collecting chamber into any of the vortex vessels is reduced to a minimum.

Figure 5:
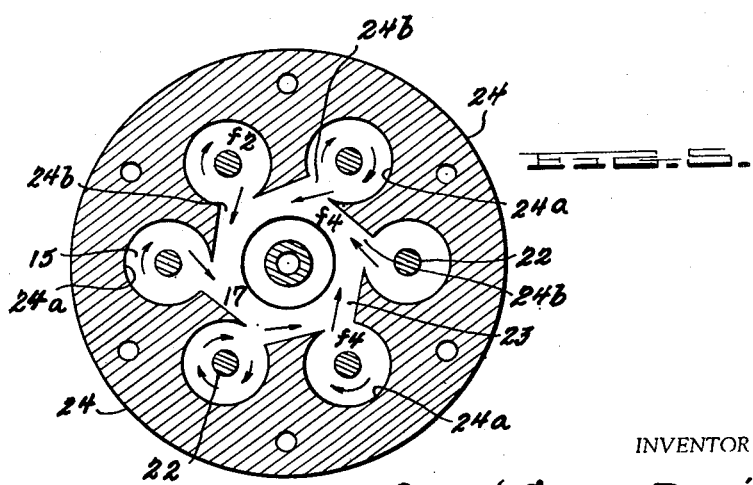

Two forms of separator according to the invention will now be described in detail, by way of example, with reference to the accompanying drawings, in which:

Fig. 1 is a side elevation of the first form of separator, which includes six vortex vessels associated with a common collecting chamber, Fig. 2 is a vertical section, on an enlarged scale, through the separator shown in Fig. 1, Figs. 3-7 are sections taken respectively on the lines III—III, IV—IV, V—V, VI—VI and VII—VII in Fig. 2, and Fig. 8 is a side elevation of an alternative form of separator having but two vortex vessels associated with the collecting chamber.

Like reference characters designate like parts throughout the figures.

The separator shown in Figs. 1-7 will first be described.

This comprises six upright cylindrical vortex vessels 11, located above and grouped symmetrically in a circle around a common upright cylindrical collecting chamber. As will be clear from Figs. 2 and 6 the vortex vessels 11 are formed by through-going cylindrical bores in a common casting 10, on the top of which is fitted a volute inlet feed head 18 (Fig. 2) common to all the cylinders. The inlet feed head 18 carries a distributing member 18ᵃ (Figs. 2 and 4) and also six downwardly tapering outlet sleeves 19, each extending downwardly into the upper end of one of the cylinders 11, and communicating at its upper end with a volute outlet head 20, common to all the cylinders, fitted on top of the inlet feed head 18.

The paper pulp to be purified is fed, under a head of several meters of water, into the inlet feed head 18 and travels, as indicated by the arrows f1 (Fig. 4), tangentially into the spaces 18ᵇ in the distributing member 18ᵃ surrounding the outlet sleeves 19, and thence into the upper ends of the cylinders 11. Due to the vortex action, indicated by the arrows f2, dirt is thrown outwardly towards the inner walls of the cylinders 11, while the purified stock, due to reversal of the vortex at the lower ends of the cylinders, travels upwardly and out of the cylinders, as indicated by the arrows f3, through the outlet sleeves 19 to the common outlet head 20.

The casting 10 is supported on a base plate 24 which, in turn, rests on the flanged upper end 12 of a cylinder 21 of the same diameter as and constituting an upward extension of a cylinder 14 of the same diameter. The base plate 24 (Fig. 5) has therein a number of holes 24ᵃ each of the same diameter as and in register with one of the cylinders 11. Each of the holes 24ᵃ has a side outlet 24ᵇ to a central space 23 in the base plate which registers with the outwardly flared upper end 13 of the cylinder 21. Into the lower end of each cylinder 11 projects an upwardly extending central baffle 22 of mushroom shape fixed to the flange 12.

The lower end of each cylinder 11 is thus blind in that there is no opening in its bottom through which material can pass downwardly from the cylinder. The only egress for dirt-laden liquid from the annular dirt-collecting zone 15 at the bottom of each cylinder is through the side outlet 24ᵇ through which the dirt flows tangentially, as shown by the arrows f4 in Fig. 5, into the space 23 and thence tangentially into the collecting chamber, constituted by the cylinders 14, 21, in which vortex formation takes place as indicated by the arrows f5, Fig. 2. Vortex formation takes place in the common collecting chamber owing to the fact that the dirt-laden liquid can flow tangentially out of the cylinders 11 through the side outlets 24ᵇ and tangentially into the upper end of the collecting chamber, and to the fact that the outlets 24ᵇ discharge directly into the collecting chamber so that the velocity of the dirt-laden liquid is maintained. Any good stock separated from the dirt by the vortex action in the collecting chamber passes upwardly and outwardly therefrom through a central outlet pipe 17, as indicated by the arrow f6 (Fig. 2).

The baffles 22 are of mushroom shape, and their function is to prevent dirt being sucked upwardly from the bottom of any of the vortex vessels into the stream of good stock which is flowing upwardly out of the outlet sleeve 19. It will be noted that the head of each mushroom-shaped baffle is of diameter approximately equal to that of the lower end of the outlet sleeve 19. Also the height of each baffle 22 exceeds the vertical dimension of the side outlet 24ᵇ in the vortex vessel.

Beneath the collecting cylinder 14 is a cylindrical sump 16 of diameter somewhat greater than that of the cylinder 14. In the lower end of the cylinder 14 is a baffle 25 supported by a rod 26 fixed at its lower end to the bottom of the sump 16. The baffle 25 is of generally conical form, but it has a peripheral groove 27. The dirt can pass from the cylinder 14 into the sump 16 through the annular passage 28 of small cross-section surrounding the baffle 25. The dirt can flow out of the sump 16 through a tangential exit pipe 29 at the lower end of the sump.

The machine shown in Fig. 8 is similar in all its essentials to that shown in Figs. 1-7. In this case, however, two cylindrical vortex vessels 11 only are provided, these being disposed on opposite sides of the common collecting chamber. As before, dirt-laden liquid passes from the cylinders 11 through side outlets tangentially into the upper end of the collecting chamber so as to cause vortex formation in the collecting chamber. In the case of the machine shown in Fig. 8, a tangential inlet pipe 30 is provided at the top of the sump 16 for introducing water or other scavenging liquid into the sump. Valves or the equivalent (not shown) may, of course, be provided for controlling the flow of liquid through the outlet pipe 29 and also through the inlet pipe 30, when provided.

What I claim as my invention and desire to secure by Letters Patent is:

1. A vortex type separator for paper pulp, comprising an upright cylindrical collecting chamber open at its upper end, a base plate mounted on top of the collecting chamber and having therein a central circular opening constituting an upward continuation of the collecting chamber, a plurality of upright cylindrical vortex vessels mounted on the base plate and grouped closely around the central opening therein, each vortex vessel having, at its upper end, a tangential inlet for introducing pulp under pressure into the vessel and a central outlet for withdrawing purified pulp from the vessel in an upward direction, having a blind lower end containing a central upstanding baffle defining, with the inner wall of the vessel, an annular dirt-collecting zone and having at its lower end a side outlet for discharging dirt-laden liquid tangentially from its annular dirt-collecting zone into the central opening in said base plate and thence into the upper end of the collecting chamber, and a central outlet at the upper end of the collecting chamber for withdrawing upwardly therefrom good stock which may be separated from the dirt as the result of vortex formation in the collecting chamber.

2. A vortex type separator as claimed in claim 1 wherein the vortex vessels are constituted by cylindrical cavities in a common cylinder block mounted on the base plate, each cavity communicating at its lower end with a circular recess in the base plate adjoining the central opening in the base plate, said recesses being disposed symmetrically around said opening and each recess communicating with the opening by a passage extending tangentially out of the recess and into the opening, and in which the baffles are mounted on a flange on the collecting chamber disposed beneath the base plate, each baffle projecting upwardly through the associated recess in the base plate and into the associated cavity in the cylinder block.

3. A vortex type separator for paper pulp, comprising a plurality of upright cylindrical vortex vessels, each having, at its upper end, a tangential inlet for introducing pulp under pressure into the vortex vessel and a central outlet for withdrawing purified pulp from the vessel in an upward direction, and having a blind lower end containing a central upstanding baffle defining, with the inner wall of the vessel, an annular dirt-collecting zone in which the pulp may circulate without obstruction, an upright cylindrical collecting chamber common to and beneath the vortex vessels, the vortex vessels being grouped closely around the collecting chamber and each having a side outlet for discharging dirt-laden liquid tangentially from its annular dirt-collecting zone directly into the upper end of the collecting chamber, said outlets discharging tangentially into the collecting chamber, the vertical dimension of each of said side outlets being less than the height of the associated baffle, and a central outlet at the upper end of the collecting chamber for withdrawing upwardly therefrom good stock which may be separated from the dirt as the result of vortex formation in the collecting chamber.

4. A vortex type separator as claimed in claim 3 in which each baffle is of mushroom shape and comprises a cylindrical lower portion and an enlarged substantially conical head located above the upper end of the associated side outlet, the diameter of the lower end of the conical head of each baffle being substantially equal to that of the outlet at the upper end of the vortex vessel.

5. A vortex type separator for paper pulp, comprising a plurality of upright cylindrical vortex vessels, each having, at its upper end, a tangential inlet for pulp and a central outlet for withdrawing purified pulp from the vessel in an upward direction, and having a blind lower end containing a central upstanding baffle defining, with the inner wall of the vessel, an annular dirt-collecting zone, an upright cylindrical collecting chamber common to and beneath the vortex vessels, the vortex vessels being grouped closely around the collecting chamber and each having a side outlet for discharging dirt-laden liquid tangentially from its annular dirt-collecting zone directly into the upper end of the collecting chamber, said outlets discharging tangentially into the collecting chamber, a central outlet at the upper end of the collecting chamber for withdrawing upwardly therefrom good stock which may be separated from the dirt as the result of vortex formation in the collecting chamber, a sump beneath the collecting chamber and a baffle at the lower end of the collecting chamber defining, with the inner wall thereof, an annular outlet for the passage of dirt from the collecting chamber to the sump.

6. A vortex type separator as claimed in claim 5, in which the baffle at the lower end of the collecting chamber is of conical shape, with its apex upwards, said baffle being supported on a rod fixed to the bottom of the sump.

7. A vortex type separator as claimed in claim 5, in which the sump has, at its lower end, a tangential outlet pipe allowing of continuous withdrawal of dirt from the sump.

8. A vortex type separator as claimed in claim 5, in which the sump has, at its upper end, a tangential inlet pipe for the introduction of scavenging water into the sump.

9. A vortex type separator for paper pulp, comprising a plurality of upright cylindrical vortex vessels, each having at its upper end, a tangential inlet for pulp and a central outlet for withdrawing purified pulp from the vessel in an upward direction, and having a blind lower end containing a central upstanding baffle defining, with the inner wall of the vessel, an annular dirt-collecting zone, an upright cylindrical collecting chamber common to and beneath the vortex vessels, the vortex vessels being grouped closely around the collecting chamber and each having a side outlet for discharging dirt-laden liquid tangentially from its annular dirt-collecting zone directly into the upper end of the collecting chamber, said outlets discharging tangentially into the collecting chamber, a single volute feed head, coaxial with the collecting chamber, surrounding the vortex vessels and serving to feed pulp under pressure into the tangential inlets at the upper ends of all the vortex vessels, and a central outlet at the upper end of the collecting chamber for withdrawing upwardly therefrom good stock which may be separated from the dirt as the result of vortex formation in the collecting chamber.

10. A vortex type separator as claimed in claim 9, in which the vortex vessels are constituted by cylindrical cavities in a common cylinder block, and the central outlets at the upper ends of the vortex vessels are constituted by sleeves attached to the inlet feed head and depending therefrom into the cavities, the inlet feed head carrying a distributing member having therein cavities surrounding said outlet sleeves and registering with the cavities in the cylinder block, each of said cavities having a tangential inlet whereby pulp under pressure may enter the annular space surrounding the outlet sleeve in said cavity.

11. A vortex type separator as claimed in claim 9, comprising a volute outlet head, disposed above the inlet feed head, communicating with the central outlets at the upper ends of the vortex vessels and serving to receive purified stock from all the vortex vessels.

ANDRÉ CHARLES BERGÈS.

REFERENCES CITED

The following references are of record in the file of this patent:

UNITED STATES PATENTS

| Number | Name | Date |
| --- | --- | --- |
| 453,105 | Bretney | May 26, 1891 |
| 1,928,702 | O'Mara | Oct. 3, 1933 |
| 1,974,679 | Lindberg | Sept. 25, 1934 |
| 2,098,608 | Berges | Nov. 9, 1937 |
| 2,312,706 | Freeman | Mar. 2, 1943 |

OTHER REFERENCES

Ser. No. 217,628, Berges (A. P. C.), published June 1, 1943.